United States Patent Office 3,342,769
Patented Sept. 19, 1967

3,342,769
COATING COMPOSITION CONTAINING AN ETHYLENE, PROPYLENE, NON-CONJUGATED DIENE TERPOLYMER
Robert David Souffie, Wilmington, Del., assignor to E. I. du Pont de Nemours and Company, Wilmington, Del., a corporation of Delaware
No Drawing. Filed Oct. 15, 1964, Ser. No. 404,167
2 Claims. (Cl. 260—33.6)

ABSTRACT OF THE DISCLOSURE

A coating composition comprising: (I) a sulfur-curable copolymer of ethylene, propylene and a non-conjugated hydrocarbon diene, (II) a rubber selected from the group consisting of natural rubber, styrene-butadiene rubber, cis-polybutadiene, cis-1,4-polyisoprene, and neoprene, (III) carbon black, (IV) an interpolymer of formaldehyde and

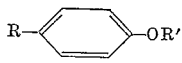

where R is 1,1,3,3-tetramethylbutyl and R' is methyl, all dispersed in (V) an inert volatile solvent; wherein:

(a) the amount of carbon black (III) shall range from about 25 to about 150 parts per 100 parts of (I);
(b) the weight ratio of (IV) to (I) ranges from about 15:85 to 40:60; and
(c) the amount of (II) ranges from about 5 to 10 parts per 100 parts of (I).

---

This invention relates to a new composition of matter and, in particular, its use as a surface coating both for improving the tack of sulfur-curable chain-saturated hydrocarbon elastomers and facilitating their adhesion to other substrates such as metals, fabrics, diene rubbers, and polyurethanes. It also relates to composite articles, such as passenger tires, rubber-lined tanks, and automobile window seals, whose construction involves the use of the coating composition of this invention.

Normally-solid, chain-saturated α-olefin hydrocarbon copolymers are becoming an increasingly important article of commerce today for making a wide variety of useful products. For many applications it is necessary that these copolymers be fabricated into laminated structures wherein they are joined to each other or other substrates such as fabric, metal, natural rubber, styrene-butadiene rubber (SBR), neoprene, and polyurethanes. In certain cases even though strongly bonded articles are obtained after the cure, it has been difficult to fix the component parts during the fabrication steps preceding the cure. A particularly important example is the joining of an α-olefin copolymer tread or white wall stock to an α-olefin copolymer carcass in the manufacture of automobile and truck tires. The α-olefin hydrocarbon copolymer stocks are rather deficient in tack, especially those of higher Mooney viscosity copolymers, for example copolymers having a value of about 70 (ML–4/250° F.). By "tack" is meant the capacity of uncured copolymer surfaces to adhere strongly when pressed together; those skilled in the art will readily understand that this property refers to a selective type of adhesion as contrasted with the more common indiscriminate property frequently referred to as stickiness. When one undertakes to construct a tire from elastomeric articles having poor tack, it may take up to three times as long to accomplish the fabrication as it would if very tacky rubbers were used. For this reason it is apparent that a satisfactory coating composition is required which provides the extra tack needed to fix the component parts prior to vulcanization and, at the minimum, does not interfere with the development of the strong bond desired after cure.

Certain coating compositions have been developed which depend upon the use of very low viscosity copolymers. Unfortunately, these materials are not commercially available at the present time. It would be highly desirable to have a coating composition utilizing the higher viscosity copolymers (ML–4/212° F.>50) which are presently available. Unfortunately, however, substitution of these copolymers for the low viscosity components called for in the aforementioned compositions does not lead to as good results in certain applications of particular interest such as tire building.

Another aspect of fabricating the articles involves the formation of a satisfactory bond after the cure. An example of this would be the bonding during curing of α-olefin white wall stock to a styrene/butadiene rubber carcass stock. Still other examples include the bonding of α-olefin copolymer to metals, fabrics, and other polymeric substrates such as polyurethanes. It should be noted that the formation of a strong bond does not require the appearance of stickiness in the coating composition to be interposed between the α-olefin polymer and substrate. It would be desirable to have a coating composition which would on curing join α-olefin copolymers to metal and copolymers to metal and facilitate the preparation of articles such as motor mounts, silent block bushings, tank linings, automotive sealing components, steam holes, tank blocks, and miscellaneous diaphragms, mounts and rolls. Some applications require the bonding of α-olefin hydrocarbon copolymers to normally solid polyamides, polyesters, and cellulosic substrates. In particularly valuable applications these materials are in the form of woven fabrics, tire cords, filaments, spun fibers, or blends thereof. Representative examples are the industrial fibers such as nylon, rayon, cotton, and polyethylene terephalate. Typical articles include passenger tire cords, industrial belts, and tarpaulins. The commercially available one-coat fabric dips have not proved entirely satisfactory for adhering α-olefin copolymers to tire cords.

It has unexpectedly been found that the surface tack of curable chain-saturated α-olefin copolymers can be improved using commercially available higher Mooney viscosity α-olefin copolymers so as to provide a satisfactory process for making composite articles from such materials in accordance with this invention which relates to a coating composition comprising: (I) a sulfur-curable, chain-saturated α-olefin hydrocarbon polymer; (II) (optionally) a diene rubber; (III) a carbon black; and (IV) a modified thermostable phenol/aldehyde type resin dispersed in; (V) a volatile solvent; with the provisos: (a) there be about 25 to about 150 parts by weight of (III) for every 100 parts by weight of (I) and (b) the value of the weight ratio of (IV) to (I) be 15:85 to 40:60. (c) The maximum proportion of (II) shall be about 15 parts for every 100 parts by weight of (I).

It has unexpectedly been found that laminates of α-olefin hydrocarbon copolymers displaying exceptional adhesive bonding prior to cure ("green bonding") can be prepared by means of the novel composition of the present invention. It is merely necessary to apply a thin coating of this composition to the copolymer surface by a conventional method. When dry, the coated article is ready for use. Advantageously, it is essentially or completely free from stickiness toward surfaces which are not to be joined to it, such as fabric rolls. The coated surface is pressed against another polymer stock which, optionally may also have a treated surface. The components which have been placed together remain firmly fixed and can be subjected, if necessary, to further shaping operations and finally cured to give adhered assemblies having a bond of satisfactory strength and resistance to heat ageing. Thus, one can readily join ethylene copolymer tread or white wall stocks or other ethylene copolymer tire carcass stocks or to styrene/butadiene rubber carcass stocks. In all cases the coating composition vastly improves the green bonding. In the case of the vulcanizates, the bonds may display substantially greater strength in some instances than that of the article bonded without the coating composition. In typical operations, the cured bond strength of ethylene copolymer/styrene-butadiene rubber laminates is improved by the use of the novel composition. In the case of the laminates made only from the $\alpha$-olefin copolymers, the cured bonds are essentially at least as good as those of the controls.

A particularly important application of the coating composition is in preparing laminates from the $\alpha$-olefin copolymers and curable conjugated diene elastomers, such as natural rubber, styrene-butadiene rubber, cis-polybutadiene, cis-1,4-polyisoprene and neoprene.

The coating composition is also exceptionally useful for bonding the $\alpha$-olefin copolymers to metals. First the metal surface must be treated with a typical primer such as the Hughson compound EX-B 506-21. Excellent adhesion values are obtained even when extremely thin coats about 0.5 mil) of the present compositions are applied. Typically the viscosity of the coating composition used here is very low, for example less than about 100 centipoises. The cured assembly exhibits extremely strong bonding of the $\alpha$-olefin copolymer to metal at both room temperature and at 100° C. A typical cement contains an ethylene/propylene/1,4-hexadiene copolymer, an ethylene/1,4-hexadiene dipolymer, natural rubber, and carbon black.

The coating composition can also be employed to promote the adhesion of the $\alpha$-olefin copolymer to fabrics. Initially the fabric is coated with the usual phenol-aldehyde type composition and dried. In a typical operation nylon fabric is dipped to a gain of 8 weight percent with an aqueous resorcinol-formaldehyde dispersion. Then the coating composition (e.g., such as that described for the metal adhesion) is applied as an overdip, typically to a weight gain of 14 percent. After the solvent has been removed the coated fabric can then be bonded to the $\alpha$-olefin copolymer by applying pressure and heating at the customary cure temperatures. A typical room temperature peel adhesion value is 28 lbs./linear in.

To join $\alpha$-olefin copolymers to polyurethanes, it is necessary to apply a coating of the composition of the present invention to the copolymer surface, allow it to dry, and then press the coated surface against the polyurethane while applying heat to effect a cure and develop the desired bond. The polyurethane can be made from any of the customary materials such as polytetramethylene ether glycol, polypropylene ether glycol, or polyesters, and the usual polyisocyanates such as toluene 2,4-diisocyanate, toluene 2,6 - diisocyanate, naphthylene-1,5-diisocyanate, methylene bis-4-phenylisocyanate, meta-phenylene diisocyanate, and 1,6-hexamethylene diisocyanate. The polyurethane may have been extended and cured with typical agents such as water or aromatic or aliphatic diamines or aliphatic polyols.

The coating composition of the present invention contains critically selected components. A large proportion of the solids is made up of the hydrocarbon polymer (I) and the carbon black (III) which contribute improved tack. The optional but distinctly preferred incorporation of the diene rubber (II) further enhances the tack and increases the cured bond strength when the coated article is joined to a diene rubber article. A very important component, although present in minor proportions, is the thermostable phenol-aldehyde type resin (IV) which supplies the remaining tack needed for successful fabrication of composite articles such as passenger tires. In particular, it makes possible the use of the less tacky high Mooney viscosity polymers as component (I). For special applications, best results may require the presence of further components; thus, it is preferred to have an activator and an accelerator present when good high temperature peel adhesion values are needed. In addition to these components, the composition can also contain optional components such as petroleum oil, antioxidants, and the like. The volatile solvent which constitutes the remaining component of the coating composition reduces the viscosity so that it is possible to apply an even thin coating in a convenient manner.

One critical component in the composition of the present invention is the curable, medium viscosity $\alpha$-olefin chain-saturated hydrocarbon copolymer (I). If the Mooney viscosity (ML-4/250° F.) of this copolymer is below about 40 (alternatively, an ML-4/212° F. value below 50), the composition may not require the phenolic resin (IV). However, such compositions may display a slight amount of stickiness which makes them less suitable for use than the compositions of this invention. Furthermore, as is pointed out above, the objective of the present invention is to provide a composition employing the more readily available high Mooney viscosity copolymers. Thus, compositions made from $\alpha$-olefin copolymers having Mooney viscosities below about 40 are of less interest here, but could be used. If the Mooney viscosity is much above about 70 (alternatively, an ML-4/212° F. value above 85), the copolymer may have sufficient tackiness when the proportions called for in the present definition of the invention are employed and the resulting composition may not be as satisfactory. The optimum Mooney viscosity needed for a particular copolymer can be determined by routine experimentation by those skilled in the art.

The ability of the copolymer (I) to impart tack does not depend upon its ethylenic unsaturation. However, sulfur-curable copolymers are preferred when one prepares sulfur-cured composite articles. Typical copolymers have at least about 0.3 gram-mole/kilogram of sulfur-curable unsaturation.

The copolymers (I) are made from $\alpha$-monoolefins and preferably, at least one non-conjugated diene. The $\alpha$-monoolefins have the structure $R-CH=CH_2$ where R is H or $C_1-C_{16}$ alkyl, preferably straight-chained. Representative dienes include: open-chain $C_6-C_{22}$ dienes having the structure

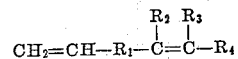

wherein $R_1$ is an alkylene radical, $R_2$, $R_3$ and $R_4$ are independently selected from the group consisting of hydrogen and alkyl radicals; dicyclopentadiene; a 2-alkyl-2,5-norbornadiene; cyclopentadiene; and 1,5-cyclooctadiene.

Representative procedures for making copolymers are given in U.S. Patents 2,933,480, 3,000,866, 3,000,867, 3,063,973, 3,093,620, and 3,093,621. When cyclic non-conjugated dienes are employed, it is preferred that the reaction mixture contain ethylene and at least one other $\alpha$-monoolefin. The ethylene copolymers should contain about 20-75 weight percent ethylene monomer units in order to be rubber-like. The Mooney viscosity is measured in accordance with ASTM Procedure 1646-61.

The copolymers having moderate Mooney viscosity values (e.g., ML-4/250°=40) can be made by conventional modifications of copolymerization conditions useful for the higher viscosity polymers. For example, hydrogen can be introduced as a molecular weight regulator as described in U.S. Patent 3,051,690. Alternatively, the catalyst concentration in the reactor can be increased until the product copolymer has a Mooney viscosity in the range called for. In general, it is preferred to use hydrogen modification because hydrogen is cheap whereas the catalyst is expensive.

Alternatively, the moderate Mooney viscosity copolymers can be made by mechanically peptizing the high Mooney type by applying strong shear at temperatures beginning at 125° C. If the temperature is significantly lower, for example 75° C., the breakdown does not occur at a satisfactory rate. The temperature for carrying out the mechanical peptization frequently ranges as high as 170–200° C. Banbury mixers, Struthers-Wells mixers and other typical internal mixers are suitable.

The conjugated diene elastomer (II) is not essential for the satisfactory application of the present composition. However, when particularly excellent properties, such as improved "quick grab," are needed it is advantageous to use a small proportion of the diene elastomer. A preferred concentration is 5 parts for each 100 parts by weight of polymer (I). As the concentration of component (II) is increased, the properties of the coating composition tend to fall off. Good results, for example, are still obtained when 10 parts of neoprene are present but when more than 15 parts is employed, a stringy bond is formed and the tack and adhesion are not entirely satisfactory for some applications, such as tire building. The optimum concentration of component (II) may depend upon the nature of the diene elastomer selected and the stock in which it is employed and the application for which the composite article is intended. Those skilled in the art can select the optimum amount by routine testing.

The conjugated diene elastomer (II) is characterized by having at least about 10 gram-moles of sulfur-curable carbon-carbon double bonds; they are supplied by the units derived from the conjugated diene monomer. Representative examples of these rubbers include: natural rubber; butadiene-styrene rubbers (SBR); polychloroprenes such as "Neoprene Type W," "Neoprene Type WHV" and "Neoprene Type WRT"; isoprene rubber; butadiene rubber; acrylonitrile-butadiene rubber; acrylonitrile-chlorophene rubbers; vinyl pyridine-butadiene rubbers; styrene-chloroprene rubbers; styrene-isoprene rubbers. The nomenclature employed for describing these rubbers is taken from paragraph 4 (a) of ASTM D 1418–58T, tentative recommended practice for nomenclature for synthetic elastomers and latices.

The preferred diene rubbers include natural rubber, SBR, acrylonitrile-styrene rubber, 1,4-polybutadiene, and cis-1,4-polyisoprene. The preferred SBR rubber contains about 54–97 weight percent butadiene monomer units; the particularly preferred SBR incorporates about 23.5 weight percent styrene units, has a Mooney (ML-4/100° C.) viscosity of about 46-54 and has a viscosity-average molecular weight of about 270,000. The particularly preferred polybutadienes have at least about 90 percent cis-1,4-units. These copolymers are more particularly described in U.S. Patents 2,913,444, 2,979,488, and 2,999,089; further processes for their preparation are given in German Patent 1,112,834. Polybutadiene containing a lower cis content and still suitable for use is described in U.S. Patents 2,908,672 and 2,908,673. The polyisoprene preferred is largely made up of 1,4-monomer units of which about at least 90 percent are cis. Preparation of these polymers is more particularly described in U.S. Patents 2,849,432, 2,856,391, 2,908,672, 2,908,673, 2,913,444, 2,977,349, and 2,979,494.

In place of the single α-olefin copolymer (I) a blend of α-olefin copolymers can be employed. A very valuable 3-component composition comprises a compounded solvent dispersion of a low diene content α-olefin hydrocarbon copolymer, a high diene content α-olefin copolymer, and a conjugated diene elastomer; said low diene weight copolymer amounting to 40 to 50% by weight of total polymer present and being characterized as a sulfur-curable copolymer of at least one α-monoolefin and at least one non-conjugated diene, having a Mooney viscosity (ML-4/250° F.) of about 70 or less, and having about 0.3 to 2 gram-moles of carbon-carbon double bonds per kilogram; said high-diene copolymer amounting to about 25 to 35% by weight of total polymer and being characterized as a sulfur-curable copolymer of at least one α-olefin and at least one non-conjugated diene, having a Mooney viscosity (measured as before) not exceeding about 70, and having at least about 2.4 gram-moles of carbon-carbon double bonds per kilogram; said conjugated diene elastomer amounting to 20 to 30% by weight of total polymer and being characterized as previously described.

Particularly valuable α-olefin copolymers having a high degree of unsaturation are made from ethylene and 1,4-hexadiene in inert liquid media with coordination catalysts in accordance with the general procedures of U.S. Patent 2,933,480. The preferred catalyst is prepared by mixing about one molar proportion of vanadium tris(acetylacetonate) with 7.5 molar proportions of diisobutyl aluminum chloride. The copolymer can also be made in the presence of catalysts prepared by mixing vanadyl chloride or vanadium tetrachloride and organo aluminum compounds such as diisobutyl aluminum monochloride. The preferred concentration of vanadium in the co-polymerization reaction zone ranges from about 0.0002 to 0.001 gram-atom per liter; however, it may be employed in higher or lower concentrations, if desired. It is frequently preferred to introduce the catalyst after the hexadiene has been added to the reactor, but before the introduction of the highly reactive ethylene (which is frequently admixed with nitrogen).

Representative liquids for making ethylene/1,4-hexadiene copolymer include halogenated hydrocarbons such as tetrachloroethylene, carbon tetrachloride, methylene chloride, ethyl chloride and 1,2-dichloroethane; liquid paraffins and cycloparaffins such as pentane, cyclohexane, 2,2,4-trimethylpentane and n-octane; and aromatic hydrocarbons such as benzene, toluene, and mixed xylenes.

The third component which is critically necessary for the success of the present composition is the carbon black. It not only contributes to the tack needed for "green bonding" but it particularly aids in attaining adequate peel adhesion after cure. Example 3 illustrates typical results: when the coating composition lacks carbon black, the peel adhesion at room temperature falls about 5%; at 212° F. the laminate is almost without strength, the value plummeting from about 59 to about 1. Preferably about 25–150 parts of carbon black are used for every 100 parts of α-olefin copolymer (I). The composition properties tend to fall off when less than 25 parts of black are provided. Similarly, when more than 150 parts of carbon black are present, the composition no longer is entirely satisfactory. The carbon black employed can be varied by those skilled in the art in accordance with results obtained by routine experimentation. Frequently, it is preferred to match the carbon black to the carbon black employed in the copolymer stock being coated. The preferred carbon blacks are the ones which are considered to be reinforcing blacks, such as the furnace process carbons. Representative examples include SAF, HAF, SRF, HFM, CF, and FF. Alternatively, channel blacks can be employed, such as EPC, MPC HPC and CC. Thermalcarbons can be used but are not as suitable as the above mentioned reinforcing types.

The curing additives which can be present in the novel composition include a metal oxide, a curing accelerator and optionally sulfur. It is generally not necessary to introduce sulfur itself; the sulfur present in the substrates being bonded by the present composition is sufficient. If desired, about 0.2 to about 2.0 parts of sulfur can be supplied for every 100 parts by weight of the α-olefin copolymer (I). The concentration of metal oxide generally ranges from about 3 to 10 parts per 100 parts of the copolymer (I). Zinc oxide is the preferred metal oxide although cadmium oxide or lead oxide can be also employed. Conventional accelerators for vulcanizing α-olefin copolymers and other synthetic elastomers can be employed here. The most active accelerators include 2-mercaptobenzothiazole, thiuram sulfides, dithiocarbamates, and very similar derivatives. The thiuram sulfides and the dithiocarbamates are generally preferred because they produce rapid curing without attendant scorching and develop and maintain maximum physical properties even or extended curing cycles. Alternatively, however, 2-mercaptobenzothiazole and its derivatives, alone or in combination with thiurams or dithiocarbamates provide adequate acceleration with processing safety. Representative accelerators include: tetramethylthiuram monosulfide; tetramethyl thiuram disulfide; tellurium diethyldithiocarbamate; the zinc salt of dimethyldithiocarbamic acid; the piperidine salt of pentamethylenedithiorcarbamic acid; 2-mercaptothiazoline; 2-mercaptobenzothiazole; N,N - diethyl - thiocarbamyl - 2-mercaptobenzothiazole, and 2,2′-dithiobisbenzothiazole. A representative and preferred accelerator includes tellurium diethyldithiocarbamate (1.5 parts) or tetra-methyl-thiuram disulfide (0.75 part). Those skilled in the art can select by routine empirical experiments the best combinations of accelerators when curing a particular assembly.

A particularly critical component in the present composition is the tackifying agent (IV). As has been pointed out above, this agent makes possible the use of the available higher viscosity α-olefin copolymers which are attractive in being commercially available and in providing a composition essentially free from the undesirable stickiness characteristic of the previous compositions made with the low viscosity α-olefin copolymers.

The tackifying agent (IV) can in general be characterized as a thermostable phenol/aldehyde-type resin. Typical molecules of these materials have the following formula:

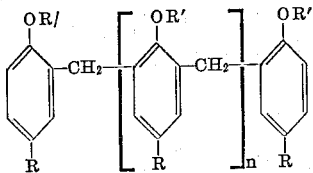

R is a hydrocarbon radical preferably having no more than about 20 carbon atoms. Most frequently R will be alkyl, preferably of moderate length and branched, e.g., tert-butyl and 1,1,3,3-tetramethylbutyl. At least some of the R groups may be cycloalkyl (e.g., cyclohexyl) or aryl (e.g., phenyl) or alkaryl (e.g., tert-butyl phenyl) or aralkyl (e.g., benzyl or cumyl). R′ is either hydrogen or alkyl, preferably having no more than about 20 carbon atoms. Suitable resins are available wherein R is 1,1,3,3-tetramethylbutyl and R′ is methyl (e.g., Catalin "CR–9334") or R is ethyl (e.g., Catalin "CR–10090"); wherein R is branched nonyl and R′ is methyl (e.g., Catalin "CR–10093") or ethyl (e.g., Catalin "CR–10094"); and wherein R is branched nonyl and R′ is hydrogen (e.g., Bakelite "CRRA–0709"). These compounds are made by modifying novolacs. As is well understood by those skilled in the art, the novolacs themselves are prepared by condensing formaldehyde with a phenolic compound, preferably substituted in the paraposition as shown, under acidic conditions. These polymers typically contain aromatic nuclei joined by methylene CH₂ bridges and are free from terminal methylol (CH₂OH) groups; in contrast the heat reactive resoles contain terminal methylol groups and frequently at least some CH₂—O—CH₂— bridges. Novolacs are generally described in publications such as Phenoplasts: Their Structures, Properties, and Chemical Technology, T. S. Carswell, volume VII of High Polymers, Interscience Publishers Inc., New York. Other references to the thermostable novolacs are contained in Rubber Age, volume 92, pages 745–748 (February 1963) and Rubber Chemistry and Technology, volume 36, No. 5, pages 1558–1570 (December 1963).

Representative examples of these modified novolacs have melting points in the range from about 60 to 80° C. (Nagel), exhibit specific gravities in the range of about 0.987 to about 1.013, contain about 3 to 5% phenolic hydroxyl groups by weight, have an alkyl group R′ in place of about 25–75% of the phenolic hydrogen atoms.

The value of the weight ratio of phenolic compound (IV) to copolymer (I) is in the range of 15–85 to 40:60. If too high a proportion of copolymer is present, the resulting composition displays insufficient tack. If too great a proportion of the resin is present, the adhesion tends to fall off.

After the solid stock has been compounded, as described above, it is then dispersed in a volatile organic solvent. The composition can be made at any convenient operating temperature; 20–40° C. is frequently a convenient range to work in.

The inert organic liquid can be any solvent or mixture of solvents used conventionally to dissolve α-olefin hydrocarbon copolymers. The best solvent system for a particular combination of polymers can be determined by routine selection and testing. Aliphatic hydrocarbons such as n-hexane, cycloaliphatic hydrocarbons such as cyclohexane, and aromatic hydrocarbons such as benzene are representative organic liquids. In a representative procedure the compounded dry stock is cut into the form of 1 by 4 by 0.2-inch strips, introduced into a jar containing benzene and porcelain balls, and then agitated overnight by rotating the jar on moving rollers. When a smooth cement has been obtained, it is then further compounded with the tackifier (IV). Petroleum oil can be added at this time or, optionally, the petroleum oil could have been present in the organic solvent at the time the cement was prepared.

To obtain outstanding results it is essential that the coating compositiion be as uniformly dispersed as possible. It is particularly important that components (I), (II), and (III) be well mixed before being dispersed in the volatile solvent. Preferably they are dry mixed. Sulfur curing aids, such as zinc oxide, and the usual accelerators are introduced at this time along with optional additives such as antioxidants. The curing agents are generally not introduced into the composition after it has been dispersed in the volatile liquid. The compounding can be carried out with any conventional rubber roll mill or internal mixer such as the Banbury or the Struthers-Wells mixers. Alternatively, it is possible to mix the components (I), (II), and (III) in solution and thereafter remove the volatile solvent before introducing the sulfur curing aids and the like. In a particularly advantageous embodiment of this alternative polymer (II) and the carbon black (III) are introduced into the process stream containing the α-olefin copolymer (I) prior to its isolation. The mixture finally obtained can be compounded with the sulfur curing aids and accelerators as previously described.

The coating composition is applied in the conventional manner familiar to those skilled in the adhesive art; brushes, rollers, swabs and the like can be employed to spread the composition across the surface being treated. The requisite thickness of a particular coating will depend somewhat on the solids content of the composition; preferably, the amount of the composition applied is sufficient to leave a dry coating about 1 to 5 mils thick. Those skilled in the art can determine by routine testing the best thickness to use for a particular application.

After the coating has been applied, the volatile solvent is evaporated. This often requires a half to two hours at 25–30° C. When the coating has dried, the coated article is ready to use. Curing when desired is accomplished by the usual procedures such as heating under pressure in the range of 10–500 p.s.i. When the assembly is press cured, the coating may be squeezed out excessively if the pressure is too high. It is, therefore, sometimes advantageous to apply a pressure below that at which this loss occurs, allow the cure to proceed for about 10–15 minutes, and finally restore and maintain the initially applied pressure for the remainder of the curing time.

The curing temperature used can generally be selected from those values recommended in the art for sulfur-curable α-olefin copolymers, natural rubber or styrene-butadiene rubber. Temperatures generally range between about 130 and 160° C. with about 150 to 160° C. being preferred. Cure times will range between about 15 to 45 minutes. The time will vary inversely with the temperature, higher temperatures usually requiring shorter cure times. Those skilled in the art can determine the best time by routine testing taking into account such factors as the conditions recommended in the art for the particular curing system being used.

Before the fabric is treated with the composition of the present invention, it is first coated with a heat-hardening phenol/aldehyde type of resin. Preferably these resins thermally set within a temperature range of from about 65–225° C. without added catalyst. Suitable phenolic compounds useful in the preparation of these resins include mono- and polyhydroxy benzenes, particularly dihydroxy benzenes wherein the hydroxy groups are in the meta position with respect to each other; resorcinol is preferred. Among the suitable aldehydes formaldehyde, or materials furnishing formaldehyde such as paraformaldehyde, is preferred.

The heat-reactive phenol-aldehyde type resins are prepared by procedures familiar to those skilled in the art. The water-soluble type can be made by reacting 0.5 to 2.0 mols of formaldehyde with a phenolic compound such as resorcinol under conditions which are neutral to basic. A strong basic catalyst, such as an alkali metal hydroxide, is customarily employed to provide the desired pH. The mixture of the resorcinol, formaldehyde, and alkali catalyst is usually allowed to react at about 25° C. but higher temperatures may be employed to hasten the reaction, if desired.

Representative resorcinol resins have been made by reacting 0.72 to 2 molar proportions of formaldehyde with one molar proportion of resorcinol such that the final pH ranges from about 7.4 to 10.0.

Although the phenol-aldehyde type resin alone gives excellent results as the first coat of this adhesive system, it is sometimes advantageous to use mixtures of the resin and a latex. Wide variations may be tolerated in the amount of latex used. For example, useful mixtures of butadiene-styrene-2-vinyl-pyridine latex and resin from 0.5:1 to 6:1. It is within the scope of one skilled in the art to choose the particular application. The choice between a phenol-aldehyde type resin and a resin-latex mixture will depend on the performance requirements of the particular application; for example, one reason to use a resin-latex blend would be to give the first coat more flexibility.

These phenol-aldehyde type resin-latex combinations may be prepared by first condensing formaldehyde and resorcinol to a low degree of polymerization. To the resulting resin one then adds the latex blend. The resulting composition is applied to the cord or fabric and dried. During this period the polymerization of the resorcinol/formaldehyde resin continues. The blend can be applied by any of the procedures suitable for applying the resin itself.

After the resin has been applied, it is necessary to remove any water present. In typical operations a zone is maintained at from about 100 to about 225° C. The optimum conditions for a given application can be easily determined by routine testing. Representative conditions include 20 min. at 135° C., or 1–2 min. at 200° C.

The higher molecular weight materials suitable for use in the present invention can be melted and will dissolve in conventional organic solvents. Heat-reactive, oil-soluble phenolformaldehyde resins are more particularly described in Phenoplasts: Their Structure, Properties, and Chemical Technology, T. S. Carswell, vol. VIII of High Polymers, Interscience Publishers, Inc., New York, pp. 6–73, 204–207; W. A. Pardee and W. Weinrich, Ind. Eng. Chem. 36, 595–603 (1944); E. C. Britton, Ind. Eng. Chem. 33, 965 (1941); V. H. Turkington and I. Allen, Ind. Eng. Chem. 33, 966–971 (1941); U.S. Patents 1,996,069, 2,364,192, 2,963,462, and 2,972,600.

The invention will now be described with reference to the following examples of specific embodiments thereof wherein parts and percentages are by weight unless otherwise specified.

EXAMPLE 1

A. Preparation of coating composition (1) *Medium viscosity α-olefin hydrocarbon copolymer.*—An ethylene/propylene/1,4-hexadiene copolymer having a Mooney viscosity (ML–4/250° F.) of about 40 and the following monomer unit composition (by weight)—52% ethylene, 44% propylene and 4% 1,4-hexadiene, is prepared in tetrachloroethylene with a diisobutyl aluminum monochloride/vanadium oxytrichloride catalyst in accordance with the general teachings of U.S. Patent 2,933,480.

(2) *Ethylene/1,4-hexadiene dipolymer.*—An ethylene/1,4-hexadiene dipolymer is prepared in tetrachloroethylene and a vanadium tris(acetylacetonate)/diisobutyl aluminum chloride catalyst in accordance with the general teachings of U.S. Patent 2,933,480. This dipolymer has a Mooney viscosity (ML–4/100° C.) of about 25, an inherent viscosity of about 1.43 (measured on a 0.1% solution in tetrachloroethylene at 30° C.), and typically contains about 2.88 gram moles of carbon-carbon double bonds per kilogram.

(3) *Preparation of the fluid coating composition.*—A compounded copolymer mixture is prepared on a rubber roll mill at about 75–100° F. by the following recipe:

|   | Parts |
|---|---|
| Medium viscosity α-olefin copolymer | 45 |
| Ethylene/1,4-hexadiene dipolymer | 30 |
| ZnO | 5 |
| HAF black | 50 |
| Tetramethylthiuram monosulfide | 1 |
| 2,2'-dithiobisbenzothiazole | 0.5 |
| Natural rubber (smoked sheet) | 25 |

This mixture is cut into 1 x 4 x 0.15-inch strips and added to 5 times its weight of trichloroethylene in a jar equipped with porcelain balls. The container is subsequently rotated on moving rollers at 25–30° C. until a smooth dispersion is obtained; typically, about 16 or more hours are required.

Two coating compositions 1A and 1B are then prepared by adding 7.5 parts by weight of a typical modified thermostable formaldehyde/phenol resin (available as Catalin Resins "10091" and "10094") to 100 parts by weight of the trichloroethylene dispersion. Each resulting composition contains about 29 weight percent total solvents.

B. Preparation of tread, carcass, and white-wall stocks (1) *High viscosity α-olefin hydrocarbon copolymer.*—An ethylene/propylene/1,4-hexadiene copolymer having a Mooney viscosity (ML–4/250° F.) of about 70 and the approximate monomer unit composition of 52% ethylene, 44% propylene and 4% 1,4-hexadiene is prepared in tetrachloroethylene with a diisobutyl aluminum monochloride/vanadium oxytrichloride catalyst in accordance with the teaching of U.S. Patent 2,933,480.

(2) Stocks, all principally based on the high viscosity α-olefin hydrocarbon copolymer are prepared by compounding the following ingredients on a rubber roll mill at 75–100° F.:

| Ingredient | Parts | |
|---|---|---|
| | Tread | White-Wall |
| High-Mooney α-Olefin Copolymer of B (1) above | 1000 | 950 |
| Chlorosulfonated Polyethylene [1] | 0 | 50 |
| Zinc Oxide | 50 | 50 |
| Stearic Acid | 10 | 0 |
| HAF Carbon Black | 720 | 0 |
| CaCO₃ [2] | 0 | 700 |
| TiO₂ rutile | 0 | 400 |
| Naphthenic Petroleum Oil of Part (2) above | 400 | 400 |
| 2,6-di-tert-butyl-4-phenylphenol antioxidant | 0 | 20 |
| Aquamarine Blue | 0 | 2 |
| Sulfur | 17.5 | 15 |
| Tetramethyl thiuram monosulfide | 15 | 15 |
| 2-mercaptobenzothiazole | 7.5 | 7.5 |

[1] The chlorosulfonated polyethylene (made in accordance with the procedures of U.S. Patents 2,586,363 and 2,862,917) analyzed for 1.0% sulfur and 26.5% chlorine by weight; the polyethylene before chlorosulfonation had a density of 0.96 g./cc. and a melt index of about 0.7.
[2] "Super Multifex," an ultra-fine, surface coated calcium carbonate; particle size 0.03 micron; commercially available from Diamond Alkali Company.

(3) A styrene-butadiene (SBR) carcass stock is compounded by mixing the following ingredients on a rubber roll mill at 75–100° F.:

Ingredient: Parts
SBR [1] _____ 400
Natural rubber (smoked sheet) _____ 500
Whole tire reclaim [2] _____ 220
Peptizing agent [3] _____ 5
Zinc oxide _____ 40
Stearic acid _____ 20
SRF carbon black _____ 430
Naphthenic petroleum oil [4] _____ 50
Sulfur _____ 22
Dibutyl ammonium oleate activator [5] _____ 8
2,2'-dithiobisbenzothiazole _____ 10

[1] "SBR-1500," a styrene/1,3-butadiene copolymer having about 23.5 weight percent styrene units, a Mooney viscosity (ML-4/100° C.) of about 46–54 and a viscosity-average molecular weight of about 270,000.
[2] "Midco-B," whole tire reclaim (containing SBR, natural rubber, carbon black, processing oils).
[3] Peptizing agent "RPA No. 6" (active ingredient pentachlorothiophenol) commercially available from Du Pont Co. as a light gray powder having a specific gravity of 1.79.
[4] This naphthenic petroleum oil (commercially available from Sun Oil Co. as "Circo" light process oil) has a flash point of 330° F., a specific gravity (60/60° F.) of 0.9242, a viscosity-gravity constant of 0.887, less than 15% N-bases and first acidaffins, 20% aromatic carbon atoms, 40% naphthenic carbon atoms, and 40% paraffinic carbon atoms.
[5] "Barak," an activator and processing aid commercially available from Du Pont Co.; the active ingredient is dibutyl ammonium oleate; it is supplied as a liquid having a flash point of 215° F. and a specific gravity of 0.88.

C. Preparation of uncured assemblies

A series of uncured assemblies is prepared. In each case a coating composition of part A above is brushed onto the surface of a 1 x 4 x 0.15-inch elastomer slab to give an even coating 0.5–3 mils thick and allowed to dry at 25° C. (usually requiring about 12 to 24 hours). The coated sides of pairs of stocks are then pressed together by rolling a 2-lb. weight 4–5 times over the uncoated backing. The weight is then removed. After about 2–5 minutes the cohesion of the resulting laminate is tested by pulling the layers apart by hand.

In the following table the tread and white-wall stocks are prepared from the high-Mooney α-olefin copolymer described in part B(1) above and compounded as in part B(2) above, and the carcass stock is that prepared as in part B(3) above:

TABLE I(a)

| Assembly | Coating | Cohesive Tack |
|---|---|---|
| Tread-SBR Carcass | 1A | Excellent. |
| Do | 1B | Do. |
| White Wall-SBR Carcass | 1A | Do. |
| Do | 1B | Do. |

If no coating is used, the tack is poor and if the resin component is omitted from the coating, the tack is only fair.

D. Preparation of cured assemblies 1 x 4 x 0.2-inch slabs of high-Mooney α-olefin tread and white-wall stocks of part B(2) and ABR carcass stock of part B(3) are swabbed with cyclohexane and dried for about 1 hour at 25° C. Then a thick layer of the adhesive of part A is applied to one side of each copolymer slab and dried at 25–30° C. for 1 hour to give a coating 0.5–3 mils thick. Canvas backing is attached to the uncoated sides by means of a conventional adhesive. The assemblies, made by placing the coated sides together, are cured in a 1 x 4-inch plunger mold at about 500 lbs./sq. in. for 30 minutes at 307° F. Typical resulting bond strengths are reported in Table 1(b) wherein the tread and white-wall stocks are of α-olefin copolymer:

TABLE I(b)

| Assembly | Coating | Peel Strength at 25° C. (lb./in.) |
|---|---|---|
| Tread-SBR Carcass | 1A | 36 |
| Do | 1B | 16 |
| White-Wall-SBR Carcass | 1A | 27 |
| Do | 1B | 32 |

If the coatings are omitted, the peel strengths are about zero; if the resin component is omitted from the coating, the peel strengths are poorer.

If the medium Mooney copolymer (ML-4/250° F.=40) in coating of part A is replaced by low Mooney copolymer (ML-4/212° F.=23.5), the results are:

| Assembly | Coating | Peel Strength at 25° C. (lb./in.) |
|---|---|---|
| Tread-SBR Carcass | 1C | 50 |
| Do | 1D | 40 |
| White-Wall-SBR Carcass | 1C | 40 |
| Do | 1D | 34 |

EXAMPLE 2

A. Preparation of coating compositions

The following composition is mixed on a rubber roll mill at 75–100° F.:

Component: Parts
Medium viscosity α-olefin copolymer of Ex. 1 __ 100
Zinc oxide _____ 5
HAF carbon black _____ 50
Tetramethyl thiuram monosulfide _____ 1.5
2-mercaptobenzothiazole _____ 0.5
Neoprene FB _____ 5
Naphthenic petroleum oil _____ 60

A smooth cement is made in accordance with the general procedure of Example 1 by dispersing 160 parts by weight of this mixture in 1200 parts by weight of trichloroethylene.

A coating composition 2A having 15.3% total solids is made by blending 500 parts of the cement and 8.85 parts of a thermostable formaldehyde-phenol resin (available as "Catalin Resin CR-9334"). In 2A there are 33.4 parts of resin for every 100 parts of α-olefin copolymer.

B. *Preparation of tread, carcass, and white-wall stocks*

Tread and white-wall stocks are prepared from the high viscosity α-olefin hydrocarbon copolymer in accordance with the procedure described in part B(2) of Example 1.

Carcass stocks are prepared from the high viscosity α-olefin hydrocarbon copolymer by compounding the following ingredients on a rubber roll mill at 75–100° F.:

| Ingredient: | Parts |
|---|---|
| High-viscosity α-olefin copolymer of Ex. 1 | 100 |
| Liquid chlorinated paraffin [1] | 10 |
| Zinc oxide | 5 |
| Stearic acid | 1 |
| HAF carbon black | 72 |
| Naphthenic petroleum oil | 40 |
| Sulfur | 1.5 |
| Tetramethylthiuram monosulfied | 1.5 |
| 2-mercaptobenzothiazole | 0.75 |

[1] "Chlorovis 150A," a liquid chlorinated paraffin (commercially available from Dover Chemical Corp., Ohio) having 44–45% chlorine.

C. *Preparation of composite articles*

Coating composition 2A is applied to the tread and carcass stocks described in part B and the cohesive tack and the bond strength of the cured articles are determined by the procedure of Example 1. Table II below gives the results. In all cases the ultimate failure of the test piece is in the stock rather than the bond.

TABLE II

| Assembly | Cohesive Tack | | Peel Adhesion at— | |
|---|---|---|---|---|
| | Initial | Repeated | 25° C. Value (p.l.i.) | 100° C. Value (p.l.i.) |
| Tread-Carcass | Excellent | Excellent | 138 | 59 |
| White-Wall-Carcass | do | do | 106 | 16 |

EXAMPLE 3

This example demonstrates the effect of omitting part of the constituents of the coating composition.

A. *Preparation of coating compositions*

Nine coating compositions are made according to the general procedure of Examples 1 and 2 employing Catalin Resin "CR-9334" as the phenol/formaldehyde resin. For purposes of comparison some of the components are omitted to show their effect.

Initially, nine stocks are compounded according to the following recipe from the medium viscosity α-olefin copolymer, zinc oxide, HAF carbon black, and "Neoprene FB". Then the accelerator, activator, and naphthenic petroleum oil ("Flexon 765") are introduced. These are the proportions:

Cement compositions are made by blending 100 parts by weight of each of these compositions with 1,425 parts by weight of trichloroethylene. Addition of the phenol/formaldehyde resin in the proportions shown in the following table completes the preparation:

| Coating | Parts | |
|---|---|---|
| | Cement | Resin |
| 3A | 100 | 2.2 |
| 3B | 160 | 2.2 |
| 3C | 100 | 0.97 |
| 3D | 100 | 0.93 |
| 3E | 172 | 2.2 |
| 3F | 100 | 0.95 |
| 3G | 100 | 0.95 |
| 3H | 100 | 0.95 |
| 3I | 100 | 0.95 |

B. *Preparation of composite articles*

The coating compositions described above are applied to the surfaces of the α-olefin copolymer tread and carcass stocks described in Examples 1 and 2 by the procedure used in Example 1. After the stocks have been dried, the tack of the uncured articles is tested in accordance with the procedures set out in Example 1. The following results are typical.

TABLE III(a).—"GREEN BONDING" OF THREAD-CARCASS STOCKS CONTAINING HIGH VISCOSITY α-OLEFIN COPOLYMER (EFFECT OF VARIATIONS IN ADHESIVE COMPOSITION)

| Omitted Component | Tack | |
|---|---|---|
| | Quick Grab | Repeated |
| All but copolymer and resin | Fair | Very good. |
| All but copolymer, oil, and resin | Good | Do. |
| Nothing Omitted | do | Fair-good. |
| Zinc Oxide | do | Good. |
| Carbon Black | do | Very good. |
| Neoprene | do | Good. |
| Accelerator | do | Do. |
| MBT | do | Do. |
| Accelerator and MBT | do | Do. |

It is evident from the above data that the cohesive tack of the compositions containing the resin and the medium viscosity α-olefin copolymer is satisfactory regardless of whether the other components are present or not. However, the carbon black is necessary for development of adequate adhesion *after curing*. When the above composite articles are cured for 30 minutes at 307° F.

| Component | Stocks (parts by weight) | | | | | | | | |
|---|---|---|---|---|---|---|---|---|---|
| | 3A | 3B | 3C | 3D | 3E | 3F | 3G | 3H | 3I |
| Medium Viscosity α-Olefin Copolymer | 100 | 100 | 100 | 100 | 100 | 100 | 100 | 100 | 100 |
| Zinc Oxide | 0 | 0 | 5 | 0 | 5 | 5 | 5 | 5 | 5 |
| HAF Carbon Black | 0 | 0 | 50 | 50 | 0 | 50 | 50 | 50 | 50 |
| Neoprene | 0 | 0 | 5 | 5 | 5 | 0 | 5 | 5 | 5 |
| Tetramethylthiuram monosulfide | 0 | 0 | 0.5 | 0.5 | 0.5 | 0.5 | 0.5 | 0 | 0 |
| Naphthenic Petroleum Oil | 0 | 60 | 60 | 60 | 60 | 60 | 60 | 60 | 60 | at 450 lbs./sq. in. pressure, the vulcanizates typically display the following peel adhesion values:

TABLE III(b).—"CURED BONDING" OF TREAD-CARCASS STOCKS MADE FROM HIGH VISCOSITY α-OLEFIN COPOLYMER (EFFECT OF VARIATIONS IN ADHESIVE COMPOSITION)

| Omitted Component | Peel Adhesion | | | |
|---|---|---|---|---|
| | Value at Room Temperature | Point of Failure | Value at 212° F. | Point of Failure |
| All but copolymer and resin | 26 | Bond | 1 | Bond. |
| All but copolymer, oil, and resin | 39 | do | 1 | Do. |
| Nothing Omitted | 130 | Stock | 59 | Stock. |
| Zinc Oxide | 126 | do | 79 | Do. |
| Carbon black | 50 | Bond | 1 | Bond. |
| Neoprene | 132 | Stock | 82 | Stock. |
| Accelerator | 121 | Bond | 30 | Bond. |
| MBT | 117 | do | 24 | Do. |
| Accelerator and MBT | 121 | do | 22 | Do. |

For meeting all the requirements with respect to good tack and strong bonding both at room temperature and at 212° F., only the neoprene and the zinc oxide can be omitted.

EXAMPLE 4

This example illustrates the use of the high viscosity commercially preferred hydrocarbon rubber as a component of the coating composition.

A. *Preparation of coating composition*

A series of coating compositions is prepared in accordance with the procedures given in Example 1 except that the ethylene copolymer has a Mooney viscosity at 250° F. of 70. The phenolic resins are Catalin Resin "CR-9334" and Bakelite Resin "CRRA-0709."

B. *Preparation of composite articles*

Ethylene copolymer tread, white-wall and carcass stocks compounded as in Examples 1 and 2 are coated with the above compositions and tested for tack in accordance with the procedure given in Example 1. The quick grab is good, the repeated tack is very good, and the "legs" are short and very strong.

After the resulting composite articles have been cured for 30 minutes at 307° F., the peel adhesion of the bonded articles is tested both at room temperature and at 212° F. as described in Example 1. Table IV which follows gives typical values for the bond strength displayed by these articles. For purposes of comparison stocks were also made in which the coating composition included medium viscosity α-olefin copolymer. The tack was about the same for all the compositions. However, the quick grab decreased when higher viscosity copolymer was employed, but the "legs" were shorter and stronger (a desirable feature for tire building). In general the tack differences were rather subtle.

EXAMPLE 5

This example illustrates the best embodiments of the adhesive compositions for joining hydrogen rubber stocks to SBR.

A. *Preparation of the fluid coating compositions*

The following components are well dispersed on a warm rubber roll mill:

| | Parts |
|---|---|
| α-Olefin copolymer (Mooney=25) | [1] 27 |
| Medium viscosity α-olefin copolymer (Mooney=40) | [2] 27 |
| Natural rubber (smoked sheet) | 15 |
| Ethylene/1,4-hexadiene dipolymer | 18 |
| ZnO | 5 |
| HAF black | 50 |

[1] A-1 only.
[2] A-2 only.

After the mill has been cooled, the remaining components are added:

| | Parts |
|---|---|
| Tetramethylthiuram monosulfide | 1 |
| 2,2'-dithiobisbenzothiazole | 0.5 |

The compositions A-1 and A-2 (325 parts by weight) are each dispersed in a mixture of 120 parts of naphthenic petroleum oil and 4700 parts of trichloroethylene by ball milling according to the procedure of Example 1.

A series of coating compositions is prepared by adding 4 parts of resin (Catalin "CR-10091"; "CR-10094"; or "9334") to 273 parts by weight of the above trichloroethylene dispersion to give coating compositions 5A, 5B and 5C (from A-1) and 5D, 5E and 5F (from A-2) having 8.5% total solids by weight.

TABLE IV.—"CURED BONDING" OF STOCKS MADE FROM HIGH MOONEY VISCOSITY α-OLEFIN COPOLYMER WITH ADHESIVE CONTAINING 70-MOONEY α-OLEFIN COPOLYMER

| Resin Type | Weight Ratio Copolymer/Resin | Laminate | Peel Adhesion (p.l.i.) | | | |
|---|---|---|---|---|---|---|
| | | | Value at Room Temperature | Point of Failure | Value at 212° F. | Point of Failure |
| CR-9334 | 75/25 | Tread-Carcass | 86 | Stock | 43 | Stock. |
| CRRB-0709 | 75/25 | do | 142 | do | 65 | Do. |
| CR-9334 | 75/25 | White-Wall-Carcass | 43 | do | 45 | Do. |
| CRRB-0709 | 75/25 | do | 72 | do | 41 | Do. |

B. Preparation of uncured assemblies (1) The α-olefin copolymer tread and white stocks and styrene/butadiene rubber (SBR) carcass stocks described in Example 1 are used.

(2) The coating compositions made in Part A are applied to the tread, white wall, by the procedure of Example 1. SBR carcass is not painted. The "green" bond strength of the assemblies is typically as follows:

TABLE V(a)

| Assembly | Coating | Quick Grab | Repeated Tack |
|---|---|---|---|
| Tread-SBR Carcass | 5A | Good | Fair. |
| Do | 5B | Very good | Do. |
| Do | 5C | Excellent | Excellent. |
| White Wall-SBR Carcass | 5D | Good | Very good. |
| Do | 5E | Excellent | Excellent. |
| Do | 5F | do | Do. |

C. Preparation of cured assemblies

The assemblies described in part B are press cured for 20 minutes at 330° F. (450 p.s.i.). The vulcanizates typically exhibit the following properties:

TABLE V(b)

| Assembly | Coating | Peel Strength (lb./linear in.) | |
|---|---|---|---|
| | | Value at 25° C. | Value at 212° F. |
| Tread-SBR Carcass | 5A | 79 | 19 |
| Do | 5B | 45 | 13 |
| Do | 5C | 74 | 18 |
| White Wall-SBR Carcass | 5A | 41 | 15 |
| Do | 5B | 41 | 11 |
| Do | 5C | 49 | 27 |
| Tread-SBR Carcass | 5D | 68 | 16 |
| Do | 5E | 41 | 14 |
| Do | 5F | 60 | 16 |
| White Wall-SBR Carcass | 5D | 33 | 13 |
| Do | 5E | 37 | 11 |
| Do | 5F | 36 | 16 |

EXAMPLE 6

This example illustrates the use of a comparative coating composition of Example 5 as a rubber to metal adhesive.

A. Preparation of compounded α-olefin copolymer

A black loaded α-olefin copolymer composition is prepared on a rubber roll mill at 75–100° F. according to the following recipe:

| | Parts |
|---|---|
| High viscosity α-olefin copolymer | 100 |
| ZnO | 5 |
| HAF carbon black | 72 |
| Naphthenic petroleum oil | 40 |
| Sulfur | 1.5 |
| Tetramethylthiuram monosulfide | 1.5 |
| 2-mercaptobenzothiazole | 0.75 |

Steel is given a 0.5-mil coating of a primer (commercially available from Hughson as "EX-B506-21"). Then a 0.7-mil coating of composition 5C of Example 5 is applied by conventional brushing and dried.

The black loaded α-olefin copolymer composition of part A is pressed against the coated metal surface of part B at 450 p.s.i. for 30 minutes at 307° F. The peel adhesion values (90° peel test pulled at 2 inches/min.) are outstanding: typically, 129 p.l.i. at 25° C.; 97 p.l.i. at 100° C.; the failure occurred in the stock in each case. Two steel samples are given coatings 0.4 and 0.5 mil thick, respectively, of another primer (commercially available from Dayton Chemical Co. as "Thixon XD-8822"). Then a 0.3-mil coating of composition 5C of Example 5 is applied to one coated steel sample by conventional brushing and dried. The other coated steel sample is given a 0.7-mil coat of 5C. The black loaded α-olefin copolymer composition is cured against the coated steel surfaces at 450 p.s.i. for 30 minutes at 307° F. The following excellent peel adhesion values are typical of the vulcanizate:

TABLE VI

| Thickness (mils) | | Peel Adhesion (p.l.i.) at— | |
|---|---|---|---|
| Primer | Coating | 25° C. | 100° C. |
| 0.5 | 0.3 | [1] 53 | [2] 104 |
| 0.4 | 0.7 | [2] 113 | [2] 109 |

[1] Bond failure.
[2] Stock tear.

EXAMPLE 7

A. Preparation of aqueous resin composition

The phenol-aldehyde type resin is used as a resin-latex mixture prepared at 25–30° C. by dissolving 27.5 grams of resorcinol in 55.0 cc. of distilled water in a 125-cc. Erlenmeyer flask. Then 14.0 cc. of a 37 percent aqueous formaldehyde solution are added slowly with stirring and mixed for 2 minutes. The resulting resin composition is then stopped and stored for 1 hour at 25–30° C. After this period, its pH is adjusted to 7.0 by addition of a 7.85 weight percent aqueous NaOH solution. A 91.0-cc. portion of a butadiene/styrene/2-vinylpyridine resin latex ("Gen-Tac") is measured into a 16 oz. jar, and the above resin mixture is added slowly while stirring is maintained. On completion of the addition, the mixture is stirred for three more minutes and stored for 4 days before use. It has a useful life of about 30 days from the end of the initial storage period and the pH during this useful life is in the range of 7.4 to 7.9.

B. Application of aqueous resin composition to nylon

Filament nylon fabric is immersed in the resorcinol-formaldehyde resin prepared in part A above at 25–30° C. for 5 seconds. The nylon fabric substrate used is a plain weave with a count of 60 x 40 obtainable as Style SN-7 from Wellington Sears, 111 W. 40th Street, New York 18, N.Y. It is first scoured using a standard synthetic detergent to remove all finishing agents, etc. After the excess resin solution has been squeezed off, the dipped fabric is dried for 20 minutes at 135° C. Typically, a weight gain of 8% occurs (gain in weight—after drying—based on the weight of the untreated fabric).

C. Application of adhesive composition to the coated nylon

The adhesive composition 5C of Example 5 is applied by a brush to the coated nylon. After air drying the product contains about 14% of the adhesive based on the weight of the resin-coated fabric.

D. Preparation of a rubber-fabric laminate

The high viscosity α-olefin copolymer of Example 1 is compounded on a rubber roll mill at 75–100° F. in accordance with the following recipe:

| | Parts |
|---|---|
| High viscosity α-olefin copolymer | 100 |
| HAF carbon black | 50 |
| Naphthenic petroleum oil | 20 |
| Zinc oxide | 5 |
| Tetramethylthiuram monosulfide | 1.5 |
| 2-mercaptobenzothiazole | 0.5 |
| Sulfur | 1.0 |

The stock is sheeted off to give a thickness of about 80 mils. It is then vulcanized for 30 minutes at 160° C. while being pressed (about 240 p.s.i.) against the doubly coated nylon fabric prepared above.

The strength of the laminate is tested by cutting a 1 x 6-inch strip from the center and measuring the force necessary to separate the fabric from the stock at 25° C. An Instron tester is a convenient instrument for doing this. A 3-inch by 1.5-inch piece of cellophane is placed between the fabric and the stock at one end of the adhesion pad to facilitate separation.

A typical value for the peel adhesion is 28 lbs./linear inch (25° C.).

EXAMPLE 8

A. Preparation of base cement

The following components are mixed on a rubber roll mill at 75–100° F.

| | Parts |
|---|---|
| Medium viscosity α-olefin copolymer | 100 |
| ZnO | 5 |
| HAF carbon black | 50 |
| Tetramethyl thiuram monosulfide | 1.5 |
| 2-mercaptobenzothiazole | 0.5 |
| Catalin resin "CRRA–0709" | 5 |
| Naphthenic petroleum oil | 60 |

The resulting stock when dispersed in five times its weight of trichloroethylene according to the procedure of Example 1 gives a smooth cement having 20 weight percent total solids.

B. Preparation of coating compositions

Eight coating compositions 8A–8G are made by adding 7.5 parts by weight of various Catalin resins to 100 parts of the base cement and diluting with 83 parts of trichloroethylene. An eighth composition 8H contains no resin.

C. Preparation of uncured laminates

Carcass and tread stocks are made as described in Examples 1 and 2 and brush coated with the coating compositions 8A–8H made above. When dry, the treated stocks are pressed together and tested for tack as described in Example 1. The following table gives the results:

| Coating | Resin Present | Cohesive Tack Holding Power, Tread-Carcass |
|---|---|---|
| 8A | 10,089 | Good. |
| 8B | 10,090 | Do. |
| 8C | 10,091 | Do. |
| 8D | 10,093 | Do. |
| 8E | 10,094 | Do. |
| 8F | 9,334 | Very Good. |
| 8G | 0.709 | Do. |
| 8H | None | Poor. |

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

What is claimed is:

1. A coating composition comprising: (I) a sulfur-curable copolymer of ethylene, propylene and a non-conjugated hydrocarbon diene, (II) a rubber selected from the group consisting of natural rubber, styrene-butadiene rubber, cis-polybutadiene, cis-1,4-polyisoprene, and neoprene, (III) carbon black, (IV) a thermostable interpolymer of formaldehyde and

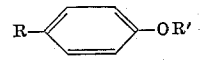

where R is 1,1,3,3-tetramethylbutyl and R' is methyl, all dispersed in (V) an inert volatile solvent; wherein:
   (a) the amount of carbon black (III) shall range from about 25 to about 150 parts per 100 parts of (I);
   (b) the weight ratio of (IV) to (I) ranges from about 15:85 to 40:60; and
   (c) the amount of (II) ranges from about 5 to 10 parts per 100 parts of (I).

2. A coating composition as defined in claim 1 wherein the copolymer (I) is a blend of (1) a copolymer of ethylene, propylene and at least one non-conjugated diene, having a Mooney viscosity (ML–4/250° F.) of about 70 or less and about 0.3 to 2 gram-moles of carbon-to-carbon double bonds per kilogram, and (2) a copolymer of ethylene, propylene and at least one non-conjugated diene, having a Mooney viscosity (ML–4/250° F.) of 70 or less and at least about 2.4 gram-moles of carbon-to-carbon double bonds per kilogram; about 40 to 50 percent of the total weight of polymer present being copolymer (1) and about 20 to 30 percent being copolymer (2).

References Cited

UNITED STATES PATENTS 3,255,274   6/1966   Yurcick et al. _____ 260—845

MORRIS LIEBMAN, Primary Examiner.

S. L. FOX, Assistant Examiner.